United States Patent
Patel

(10) Patent No.: US 10,469,411 B1
(45) Date of Patent: Nov. 5, 2019

(54) DYNAMIC APPLICATION SCALING

(71) Applicant: EMC IP Holding Company LLC, Hopkinton, MA (US)

(72) Inventor: Kshitij Patel, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 156 days.

(21) Appl. No.: 15/663,995

(22) Filed: Jul. 31, 2017

(51) Int. Cl.
*H04L 29/08* (2006.01)
*H04L 12/861* (2013.01)

(52) U.S. Cl.
CPC .......... *H04L 49/90* (2013.01); *H04L 67/1097* (2013.01); *H04L 69/329* (2013.01)

(58) Field of Classification Search
CPC ............. H04L 67/1076; H04L 43/0876; H04L 41/0893; H04L 47/39; G06F 13/28; G06F 13/4022; G06F 3/0659; G06F 3/0613
See application file for complete search history.

(56) References Cited

U.S. PATENT DOCUMENTS

2007/0268860 A1* 11/2007 Taneja ............... H04L 27/2608 370/329
2016/0316003 A1* 10/2016 Snider ................ H04L 67/1002
2016/0323377 A1* 11/2016 Einkauf ............. H04L 67/1076

OTHER PUBLICATIONS

Pivotal Software Inc., "Pivotal", 2013-2016.
RabbitMQ by Pivotal, "AMQP 0-9-1 Model Explained", Jun. 27, 2017, https://www.rabbitmq.com/tutorials/amqp-concepts.html.

* cited by examiner

*Primary Examiner* — Kim T Nguyen
(74) *Attorney, Agent, or Firm* — Muirhead and Saturnelli, LLC

(57) ABSTRACT

Techniques for performing application scaling may include: receiving a plurality of observed queue depth values for a queue, wherein the queue includes data packets to be processed by a first set of one or more applications of a first application type; determining, in accordance with the observed queue depth values and scaling configuration parameters for the first application type, whether to modify the number of applications currently in the first set, wherein the scaling configuration parameters includes a scaling threshold; and responsive to determining to modify the number of application currently in the first set, performing first processing that modifies the number of applications currently in the first set. Modifying the number of applications in the first set may include scaling up or scaling down the number of instances in the first set.

19 Claims, 11 Drawing Sheets

400

Application Name 402 (e.g., APP1)
Server Name 404 (e.g., Server A)
Queue Name 406 (e.g., App1 queue)
Min instance limit 408 (e.g., 2)
Max instance limit 410 (e.g., 10)
Scale up interval 412 (e.g., 30 seconds)
Scale down interval 414 (e.g., 5 minutes)
Scale Threshold 416 (e.g., 100)

DYNAMIC APPLICATION SCALING

BACKGROUND

Technical Field

This application generally relates to dynamic application scaling.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform PO (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of performing application scaling comprising: receiving a plurality of observed queue depth values for a queue, wherein the queue includes data packets to be processed by a first set of one or more applications of a first application type; determining, in accordance with the observed queue depth values and scaling configuration parameters for the first application type, whether to modify the number of applications currently in the first set, wherein the scaling configuration parameters includes a scaling threshold; and responsive to determining to modify the number of application currently in the first set, performing first processing that modifies the number of applications currently in the first set. The first processing may include determining, in accordance with the plurality of observed queue depth values and the scaling configuration parameters for the first application type, whether to increase the number of applications currently in the first set; and responsive to determining to increase the number of application currently in the first set, performing second processing that increases the number of applications currently in the first set. The scaling configuration parameters may be specified for the first set of one or more applications of the first application type and wherein the scaling configuration parameters may further include a scale up interval identifying a time duration for which a measured queue depth of the queue is required to exceed a boundary point in order to increase the number of applications currently in the first set, and wherein the boundary point may be a multiple of the scaling threshold. The number of applications may be increased by an amount determined in accordance with the scaling threshold and the boundary point. The boundary point may be one of a plurality of boundary points determined in accordance with the scaling threshold and wherein the number of applications is increased by one (1) for each multiple of the scaling threshold. The scaling configuration parameters may include a minimum limit, denoting a minimum number of application instances configurable for the first set, and wherein the scaling configuration parameters may include a maximum limit denoting a maximum number of application instances configurable for the first set. The second processing may include adding, in accordance with the maximum limit, one or more additional applications of the first type to the first set. The first processing may include determining, in accordance with the plurality of observed queue depth values and the scaling configuration parameters for the first application type, whether to decrease the number of applications currently in the first set; and responsive to determining to decrease the number of application currently in the first set, performing second processing that decreases the number of applications currently in the first set. The scaling configuration parameters specified for the first set of one or more applications of the first application type may include a scale down interval identifying a time duration for which a measured queue depth of the queue is required to be less than a boundary point in order to decrease the number of applications currently in the first set, wherein the boundary point may be a multiple of the scaling threshold. The number of applications may be decreased by an amount determined in accordance with the scaling threshold and the boundary point. The boundary point may be one of a plurality of boundary points determined in accordance with the scaling threshold and wherein the number of applications may be decreased by one (1) for each multiple of the scaling threshold. The scaling configuration parameters may include a minimum limit, denoting a minimum number of application instances configurable for the first set, and wherein the scaling configuration parameters may include a maximum limit denoting a maximum number of application instances configurable for the first set. The second processing may include removing, in accordance with the minimum limit, one or more applications of the first type from the first set. The plurality of observed queue depth values for the queue may be obtained at occurrences of a defined time period. The queue may be one of a plurality of queues. The first application type may be one of a plurality of application types, and each of the plurality of application types may have a corresponding set of one or more applications of said each application type. Each of the plurality of queues may include data packets to be processed by a different one of the plurality of application types, and each application of a particular one of the plurality of application types may subscribe to one of the plurality of queues based on a match between types of data processed by said each application and types of packet data in said one queue. The method may include receiving a plurality of data packets each including one or more types of packet data to be processed; and distributing the plurality of data packets to the plurality of queues in accordance with the types of packet data in the plurality of packets.

In accordance with another aspect of techniques herein is a computer readable medium comprising code stored thereon that, when executed, performs a method of performing application scaling comprising: receiving a plurality of observed queue depth values for a queue, wherein the queue includes data packets to be processed by a first set of one or more applications of a first application type; determining, in accordance with the observed queue depth values and scaling configuration parameters for the first application type, whether to modify the number of applications currently in the first set, wherein the scaling configuration parameters includes a scaling threshold; and responsive to determining to modify the number of application currently in the first set, performing first processing that modifies the number of applications currently in the first set.

In accordance with another aspect of techniques herein is a system comprising: one or more processors; and a memory comprising code stored thereon that, when executed by at least one of the one or more processors performs a method of application scaling comprising: receiving a plurality of observed queue depth values for a queue, wherein the queue includes data packets to be processed by a first set of one or more applications of a first application type; determining, in accordance with the observed queue depth values and scaling configuration parameters for the first application type, whether to modify the number of applications currently in the first set, wherein the scaling configuration parameters includes a scaling threshold; and responsive to determining to modify the number of application currently in the first set, performing first processing that modifies the number of applications currently in the first set.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
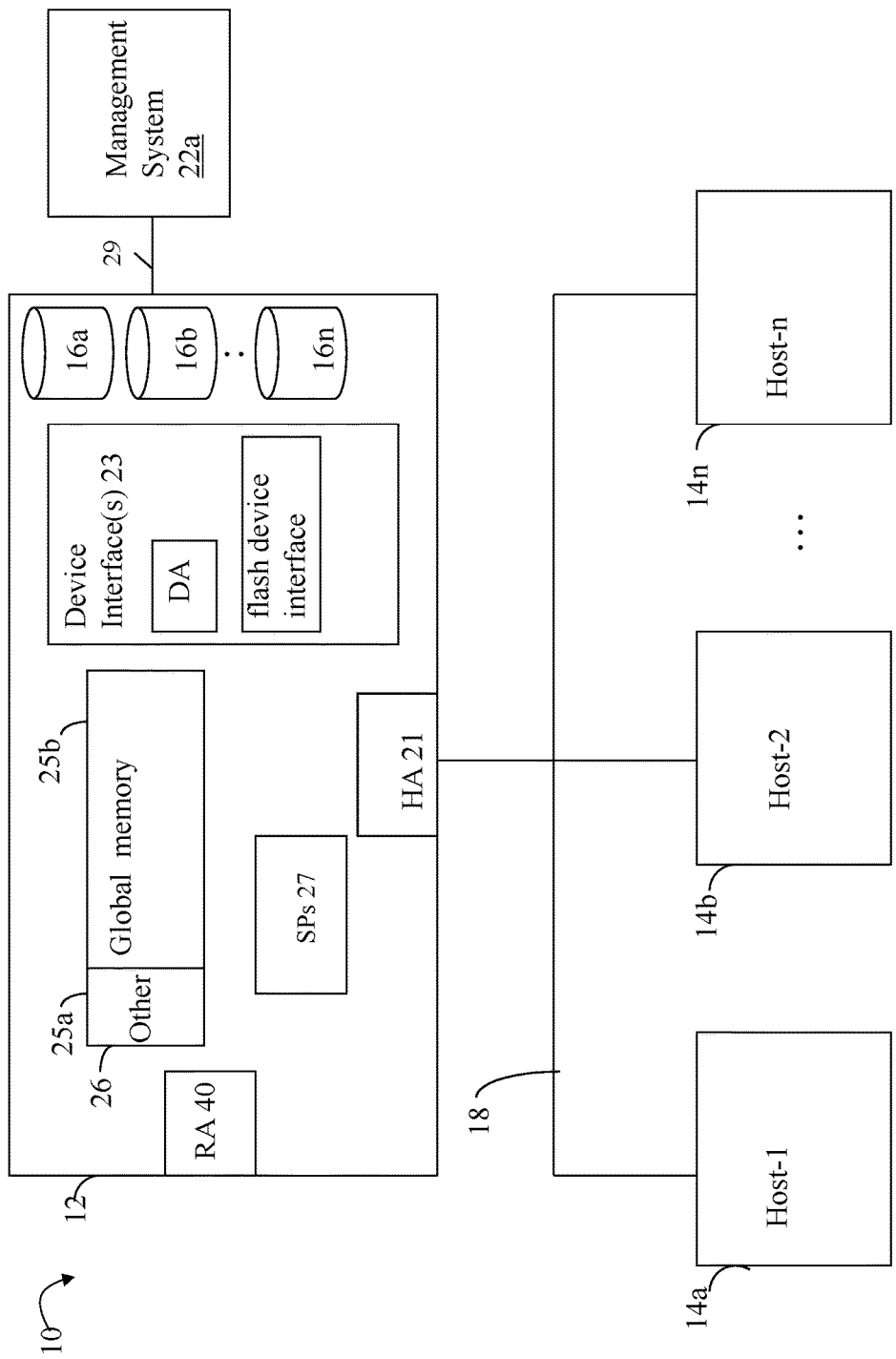
FIGS. 1, 2, 3, 8 and 9 are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication connection 18. In this embodiment of the computer system 10, and the n hosts 14a-14n may access the data storage system 12, for example, in performing input/output (I/O) operations or data requests. The communication connection 18 may be any one or more of a variety of networks or other type of communication connections as known to those skilled in the art. The communication connection 18 may be a network connection, bus, and/or other type of data link, such as a hardwire or other connections known in the art. For example, the communication connection 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication connection 18 by any one of a variety of connections as may be provided and supported in accordance with the type of communication connection 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication connection that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication connection 18 may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of physical data storage devices (PDs or physical devices) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system, or other device as described in more detail elsewhere herein, where such system or device 22a includes data storage system management software or application such as may execute in a web browser. The system 22a may communicate with the data storage system 12 over any suitable connection 29. Generally, element 29 may be a network connection such as a public internet connection, private intranet connection, and the like. Element 29 may, for example, be any suitable connection similar to the connection 18 described elsewhere herein.

A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI or block-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, create a new logical entity (e.g., RAID group, storage pool), view information on physical and/or logical data entities in a current data storage system configuration (e.g., status and health of physical storage devices, amount of free/available storage in a provisioned LUN, pool, or RAID group) and the like. For example, commands may be issued over the control path to provision storage for LUNs from a RAID group or storage pool (e.g., logically defined group of physical storage devices), create a snapshot of a LUN, file system, or other logical entity, define conditions of when to create another snapshot, delete a snapshot, define or establish local and/or remote replication services for a logical entity (e.g., file, file system, LUN), define or modify a schedule for snapshot or other data replication services, define/create a RAID group or storage group (e.g., configured from selected physical storage devices), obtain data storage management and configuration information for display, generally modify one or more aspects of a data storage system configuration, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

Figure 2:
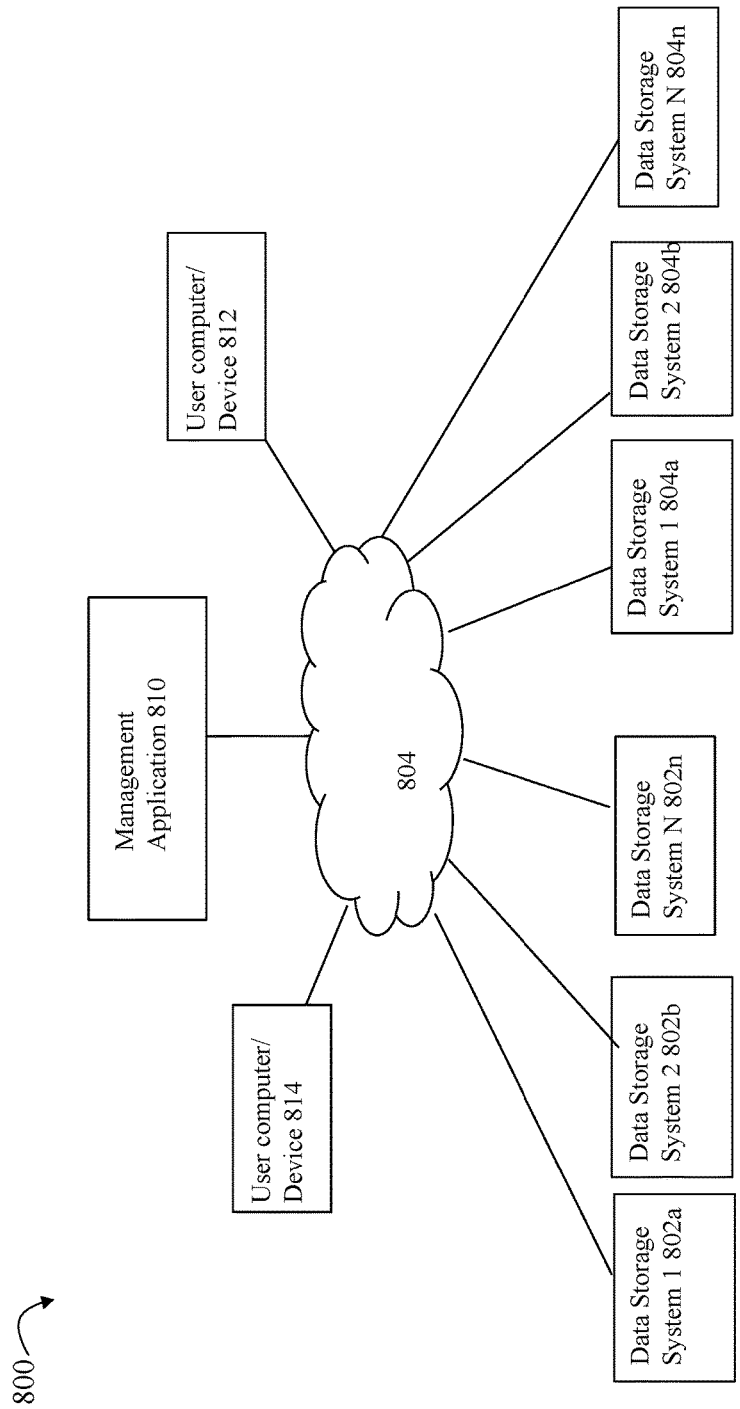

Referring to FIG. 2, shown is an example of components that may be used in an embodiment in accordance with techniques herein. The example 800 includes management application 810, user computer or devices 812, 814, network 804, and data storage systems 802a-n and 804a-n. The network 804 may be, for example, the internet to which the other illustrated components in the example 800 connect to for network connectivity. The data storage systems 802a-n and 804a-n may be data storage arrays or other system providing data storage such as described herein and/or also known in the art. The data storage system 802a-n may be a first set of data storage systems of a single first customer where each of the system 802a-n may be located geographically at various data centers and sites across the United States, and possibly other countries. The data storage system 804a-n may be a second set of data storage systems of a single second customer where each of the system 804a-n may be located geographically at various data centers and sites across the United States, and possibly other countries. The management application 810 may be a cloud-based management application that receives various types of data from the systems 802a-n, 804a-n. The management application 810 may analyze the received data and provide information to a data storage customer, such as a storage manager or administrator. In at least one embodiment, the management application may be a Software-as-a-Service (SaaS) cloud-based application accessible by users through devices 812, 814 connected to the management application 810 through the internet 804. Devices 812, 814 may be computer systems, tablets, phones, or more generally any suitable device that has a processor, connectivity to the network 804 and executes a browser or other client-side software providing access to the management application 810. For example, in at least one embodiment, the management application 810 may be Dell EMC CloudIQ™ that is a cloud-based storage analytics application providing customers with access through an interface or portal. The management application 810 may, for example, provide each customer with various metrics that the customer may view to monitor performance and other aspects of the customer's data storage system. For example, the first customer may use the management application 810 to view various metrics regarding his/her systems 802a-n, and the second customer may use management application 812 to view various metrics regarding his/her systems 804*a-n*. The management application 810 may, for example, provide various metrics, status information, and the like, regarding performance, capacity, protection, and configuration of each customer's data storage systems based on collected data. The information provided to may be used for various management tasks such as, for example, proactive monitoring and management to understand and identify problems. For example, the management application 810 may provide a customer with information regarding available storage capacity in configured storage pools; identify which storage pools and which data storage systems have the most available capacity; identify which systems and/or storage pools may be nearly out of space, provide an estimated prediction as to when a storage pool and/or data storage system may exhaust available capacity; identify which systems, storage pools or other storage entities have compression enabled and in use; provide performance metrics in order to identify different storage entities (e.g., LUNs, PDs, pools, RAID groups) which have the best performance, worst performance, are not meeting specified performance targets or goals; and the like.

Periodically, data may be collected from systems 802*a-n* and 804*a-n* which may be sent, via the network 804, to the management application 810 for analysis and processing. In at least one embodiment in which the management application 810 is CloudIQ™, particular types of data may be collected from storage systems 802*a-n*, 804*a-n*, for example, every 5 minutes. Due to the high frequency of data acquisition and also the large number of customers and systems that may be providing the data to the management application 810, there may be large amounts of data collected and processed by the management application 810.

In at least one embodiment, the management application 810 may be implemented using the Pivotal Cloud Foundry (PCF) platform and its various entities. In at least one embodiment, the management application 810 may include an application (app) scaler component which provides for horizontal scaling. Horizontal scaling refers to creating or destroying instances of an application (also known and sometimes referred to as a microservice). In connection with cloud-based services such as may be implemented using PCF, each application instance may perform a small focused job or task. For example, an application instance may process a particular type of collected data (e.g., only performance data) and may further only use a portion of collected performance data. For example, the application instance may perform processing for a single performance metric for one type of storage entity, such as a LUN. The app scaler component may, for example, provide for dynamically scaling the number of application instances or microservices which process and analyze collected data. The number of application instances may be scaled in accordance with the varying and dynamically changing workload of the application 810.

In at least one embodiment, the app scaler component may be an application itself that monitors other applications and scales the number of instances of each application type. The scaling may be based on one or more criteria. The criteria may be selected to scale the number of instances and assess when to dynamically increase and/or decrease the number of application instances. In some existing systems, the scaling may monitor the CPU load, amount of memory used, and/or number of received front end requests (e.g., front end throughput such as number of incoming received requests). However, using the foregoing criteria may not accurately and adequately assess the actual workload or processing required for each request.

Described in following paragraphs are techniques that may be used in connection with dynamically scaling the number of application instances of multiple application types based on queue depth. In at least one embodiment, the different queues bound to different application types may be monitored where the current queue depth of each such queue may be obtained periodically, such as every 30 seconds. If the current queue depth of a queue exceeds a configured threshold for a specified time period, then the number of application instances of the particular application type using the queue may be scaled upward (e.g. increased). If the current queue depth of a queue is below a configured threshold for a specified time period, then the number of application instances of the particular application type using the queue may be scaled downward (e.g. decreased).

Queue depth with respect to a queue may be defined as the number of items currently in queue. In at least one embodiment in accordance with techniques herein as described below, queues contain data packets, or more generally pending work items of data, waiting to be processed by an application instance. Application instances subscribe to a queue whereby the queue includes data packets including one or more types of data processed by the application instances. In at least one embodiment described herein using the PCF platform, the Advanced Message Queueing Protocol (AMQP) model may be used based on a publish-subscribe/subscription. As known in the art with the AMQP model, messages are published to exchanges whereby the exchanges distribute message copies to one or more queues, such as based on rules or bindings. Consumers subscribe to one or more queues in order to receive queued messages (e.g., either by pulling the message from the queues on demand, or otherwise having messages delivers from the queue to the subscribed consumers). As described in following paragraphs in connection with at least one embodiment in accordance with techniques herein, the consumers may be the application instances, the messages placed in various queues may be various data portions (e.g., such as data packets) of collected data from the data storage systems, and the exchanges may be generally characterized as servers which distribute or route received data packets to appropriate queues (e.g., where the data packets are then received by application instances for processing).

Figure 3:
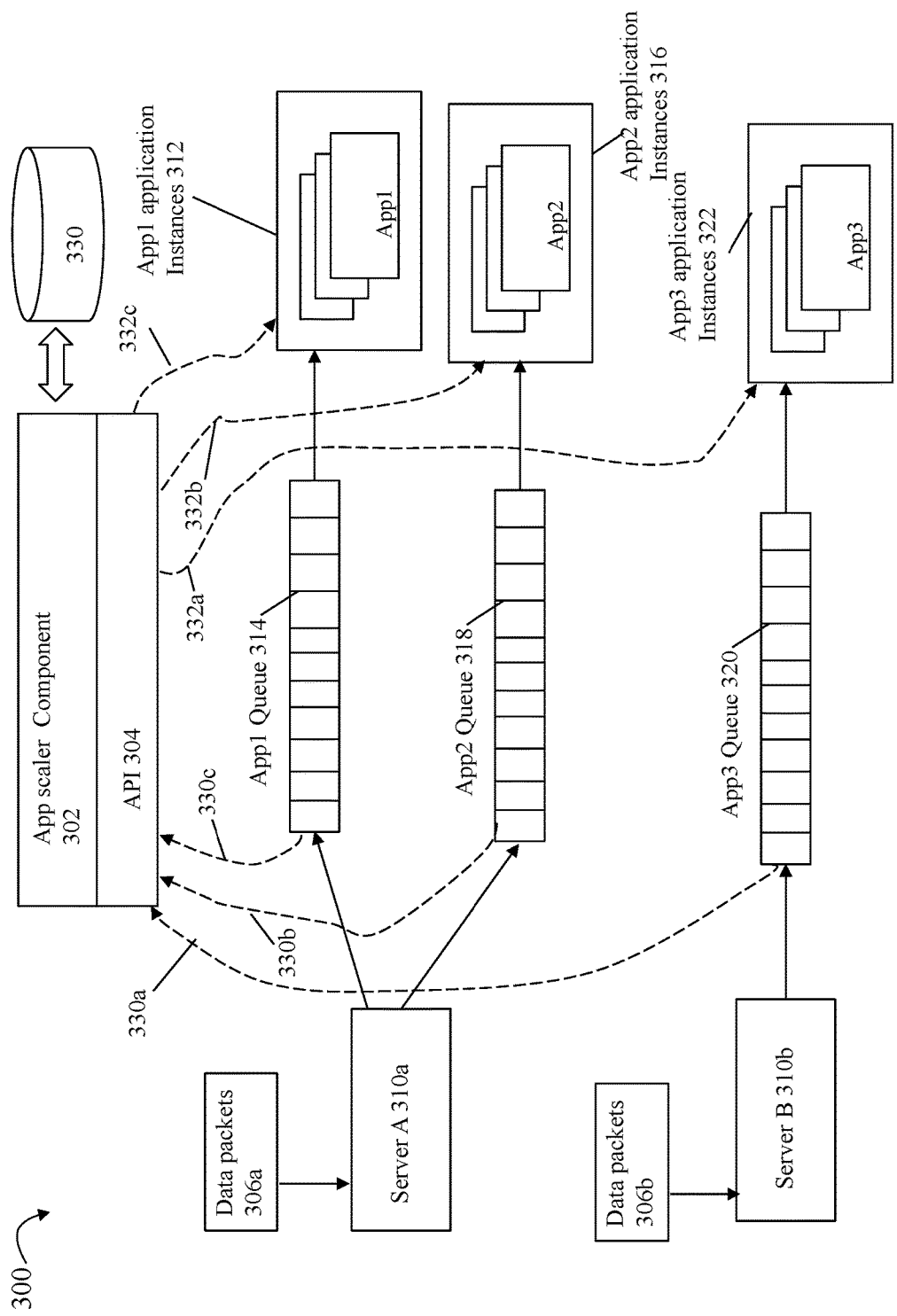

Referring to FIG. 3, shown is an example of components that may be included in an embodiment in accordance with techniques herein. The example 300 includes the app scaler component 302; API (application programming interface) 304; database 330; queues 314, 318, 320; servers 310*a*, 310*b*; application instances 312 of a first application type APP1; application instances 314 of a second application type APP2; application instances 322 of a third application type APP3; and data packets 306*a-b*.

Each of the data packets 306*a-b* received by servers 310*a*, 310*b* may include one or more types of data. The possible or allowable types of data that may occur in any data packet may be predefined set of possible data types. For example, in at least one embodiment, a data packet may include one or more of the following different types of data:

Configuration data. (e.g., Data describing the current configuration of the data storage system such as related to various physical and logical entities in the current configuration. Examples may include the number of PDs in the current configuration; attributes of the PDs such as technology (e.g., rotating drive, flash); configured RAID groups and information about the groups such as RAID type, number of PDs, particular PDs configured into each RAID group; configured/provisioned LUNs and information about the LUNs such as size/capacity, type of LUN (e.g. thick or thin/virtually provisioned), which RAID group or pool the LUN is configured from/has its storage provisioned from).

Capacity data. (e.g., Current amount of consumed and/or available capacity of different storage entities such as PDs, LUNs, RAID groups, storage pools, objects used in virtualized environments such as VMWare® virtualization software).

Performance data. (e.g., Performance analytics or metrics of various storage entities such as for each PD, each LUN, each RAID group, each storage pool, each data storage system, site or data center. Performance metrics may be based on observed or collected data such as total bytes read, total bytes written, number of I/Os processed such as I/Os per second (I/O throughput), average I/O size, average I/O response time (RT), write rate, read rate).

Data protection information. (e.g., Information such as what storage entities have data that is encrypted, storage entities for which have data replication is performed for backups or disaster recovery purposes, the particular data replication facility and schedule in effect for different storage entities).

Alert or event data. (e.g., Information regarding various events or alerts of interest such as related to security (e.g., login failures, requests to perform unauthorized operations or tasks); system events (e.g., alert generated due to amount of available unused storage capacity of a storage entity falling below a configured threshold)).

Hardware information and status. (e.g., information regarding various hardware in the data storage systems such as related to power supplies (e.g., primary and secondary such as battery backup), ports of FAs, ports of DA, health and status information regarding the two SPs, PD errors and status).

The foregoing are examples of different types of information that may be included in data packets received for processing and analysis. More generally, an embodiment in accordance with techniques herein may include any type of data. Based on the possible or allowable data that may be included in a received data packet, an embodiment may define one or more data types for the packet data such as above.

The data packets 306a, 360b may be received by servers 310a, 310b which then place the copies of the packets on one or more queues depending on the particular one or more types of data in the packet. Each of the queues 314, 318, 320 may have an associated attribute or property identifying one or more particular types of packet data. The servers 310a, 310b may distribute data packets to the various queues 314, 316, 318 based on a match between any of the type(s) of data in each packet and any type of data as identified in the attribute or property of the queues. In at least one embodiment, each of the queues 314, 318 and 320 may have an associated attribute as just described which identifies one or more data types that can be placed on the queue whereby a server places a copy of a data packet on a queue if the data packet has at least one type of data matching at least one data type of the queue's attribute. In this example 300, server 310a may distribute received packets 306a to one or both of the queues 314, 318; and server 310b may distribute received packets 306b to queue 320.

To further illustrate consider a received first of the packets 306a including two types of data, such as configuration data and performance data. Queue 314 may include both configuration and performance data (e.g., per its associated attribute or property) and queue 318 may include only configuration data (e.g. per its associated attribute or property). In this case, the server 310a places a copy of the first packet on queue 314 and another copy of the same first packet on queue 318. A second of the packets 306a may include only configuration data. In this case, the server 310a places a copy of the second packet on queue 314 and another copy of the same second packet on queue 318. A third of the packets 306a may include only performance data. In this case, the server 310 places a copy of the third packet on queue 314 but not queue 318 (since queue 318 only includes configuration data). In this manner, the server 310a distributes received packets 306a to one or more queues 314, 318 based on a match between the type of packet data and the type of data which each queue is defined as containing (e.g., match between packet data type and data type of queue attribute denoting allowable packet data types that can be placed in the queue).

An embodiment may group or categorize applications by application type. Each application type may handle processing of one or more types of packet data. In connection with the example 300, three different application types are illustrated—APP1, APP2 and APP3. For example, APP1 may denote a first type of application that processes two types of packet data, such as configuration data and performance data. Further an application of type APP1 may extract a portion of a particular type of data from the packet based on the particular processing task performed by APP1. As denoted by 312, there may be multiple instances of APP1 applications where each application instance performs the same processing task (as every other APP1 instance). APP2 application instances 316 may process only configuration data and may further extract a portion of the configuration data in a packet for the particular processing performed by APP2. APP3 application instances 322 may perform processing of packets including configuration and performance data. However, the particular task or processing performed by APP3 instances 322 may be different than the particular task or processing performed by APP1 instances 312. For example, APP1 instances 312 may perform processing for a first metric such as read rate, such as read I/Os per second, and APP3 instances 322 may perform processing for a second different metric, such as write I/Os per second. Thus, for example, an APP1 instance and APP3 instances may each operate on performance data but each may extract and utilize different portions of the performance data (e.g., APP1 instance may extract information related to reads and APP3 instance may extract information related to writes).

In one aspect, the multiple instances of a particular application type may be referred to as an application pool or group (312, 316, 322) where each instance in the same pool performs the same data processing task but on a different packet. In this manner, the number of instances of a particular application type in each of the application pools or groups 312, 316, 322 may be scaled or varied depending on the number of incoming data packets. (e.g., as the number of packets having data of a particular type processed by the application type increases, so does the number of instances of the application type). Each application instance runs independently of other application instances.

All instances of a single application type (e.g., APP1, APP2, APP3.) have a common set of subscription information with respect to the types of packet data. In this manner, applications of a particular application type may subscribe to a particular queue. To illustrate and continuing with the above example, APP1 application instances 312 may subscribe to queue 314; APP2 application instances 316 may subscribe to queue 318; and APP3 instances 322 may subscribe to queue 320. In at least one embodiment, only one type of application may subscribe to each of the queues 314, 318, 320 (e.g., whereby there is a 1-1 relationship or mapping between each of the queues 314, 318, 320 and each of the sets or pools of application instances 312, 316, 322).

The app scaler component 302 may monitor the queue depth of the various queues 314, 318, 320. In at least one embodiment, the app scaler component 302 may use API 304 such as may be included in the PCF platform or other environment to obtain a current queue depth of each of the queues 314, 318, 320. The app scaler components 302 may make an API call using the defined interface of API 304. The API 304 may denote the code, library, routine, and the like invoked in response to such an API call. Elements 330a-c denote the processing performed by API invocation to obtain current queue depth measurements for the queues 314, 318, 320, whereby such measurements are then returned to the app scaler component 302 for further processing in accordance with techniques herein.

In a similar manner, the app scaler components 302 may make an API call using the defined interface of API 304 in order to scale the number of application instances in 312, 316, 322. Elements 332a-c denote the processing performed by the API invocation to scale the number of instances, respectively, in 312, 316, 322 for the different application types. As discussed in more detail elsewhere herein, such scaling may scale up or increase the number of instances in one or more of the application pools or groups 312, 316, 322; or such scaling may scale down or decrease the number of instances in one or more of the application pools or groups 312, 316, 322.

Database 330 may be used to store historical information regarding scaling patterns observed by the app scaler component 302 over time. In this manner, the scaling patterns may be used for proactive scaling in a predictive manner based on previously observed scaling patterns. For example, a pattern of scaling up or down (and perhaps also by scaling up or down by a particular number of instances) may be observed for a time period such as a day, week, month, year, and the like.

Figure 4:
FIG. 4 is an example of configuration parameters that may be specified per application type in an embodiment in accordance with techniques herein.

Each application type may having varying needs for scaling. In at least one embodiment, a scaling configuration file may be specified for each application type to be scaled. The scaling configuration file may specify values for parameters such as will now be described with reference to the example 400 of FIG. 4.

In at least one embodiment, each configuration file specified for an application type may include an application name 402, server name 404 and queue name 406. The application name 402 may identify the name or type of the application, such as one of the possible application types APP1, APP2 or APP3 as described elsewhere herein such as in connection with FIG. 3. The server name 404 identifies the name of a server. The queue name 406 identifies the name of the queue bound to the application type (e.g., the queue to which the application type instances identified by 402 subscribe). Thus, combination of the above three items identifies the particular queue 406 monitored for a particular application type 402 where data packets are placed on the queue 406 by the server identified by 404.

The scale threshold parameter 416 identified the queue depth threshold for scaling up/down the number of application instances. This is also referred to herein as the configuration threshold. In at least one embodiment, the same threshold may be used in connection with determining whether to scale up and also whether to scale down. As a variation, an embodiment may specify two different thresholds where one is used for determining whether to scale up the number of application instances, and the other second threshold is used for determining whether to scale down the number of application instances.

In at least one embodiment, the scale threshold 416 may denote a multiple used to specify values or boundary points, where each boundary point is a multiple of the scale threshold. For example, the scale threshold may be 100 specifying a set of values or boundary points which are multiples of 100 such as 100, 200, 300, 400, etc.

In connection with scaling up, the number of application instances may be increased by 1 if the observed queue depth exceeds the next such multiple or boundary point for a specified period of time denoted by parameter 412 discussed elsewhere herein. In connection with scaling down, the number of application instances may be decreased by 1 if the observed queue depth falls below the next such multiple or boundary point for a specified period of time denoted by parameter 414 discussed elsewhere herein. The foregoing is described in more detail in following paragraphs illustrating use of the scale threshold in combination with other configuration parameters.

The min instance limit 408 denotes a lower bound. The number of application instances will not scale below the minimum number of instances denoted by 408 (e.g. 2). The max instance limit 410 denotes an upper bound. The number of application instances will not scale above the maximum number of instances denoted by 410 (e.g., 10).

The scale up interval 412 denotes an amount of time that a scaling up queue depth violation must be maintained in order to scale up or increase the number of application instances. A scaling up queue depth violation occurs when an observed queue depth measurement for the queue exceeds one of the boundary points that is a multiple of the configuration threshold, such as the scale threshold parameter noted above. Put another way, scan up interval 412 denotes a continuous amount of time whereby if, for the amount of time denoted by 412, the observed queue depth measurements continuously exceed the same boundary point (where the same boundary point is more than the previous boundary point exceeded thereby showing an increasing trend in observed queue depth), then processing is performed to scale up or increase the number of application instances. The particular number of instances is determined by the particular boundary point exceeded by the observed queue depth measurements. In at least one embodiment, each of the observed queue depth measurements for the duration of the scan up interval illustrate an increasing trend (e.g., for the duration of scan up interval successive observed queue depth measurements may be the same or increasing with time).

The scale down interval 414 denotes an amount of time that a scaling down queue depth violation must be maintained in order to scale down or decrease the number of application instances. A scaling down queue depth violation occurs when an observed queue depth measurement for the queue falls below one of the boundary points that is a multiple of the configuration threshold, such as the scale threshold parameter noted above. Put another way, scan down interval denotes a continuous amount of time whereby, if for the amount of time denoted by 414, the observed queue depth measurements are continuously less than the same boundary point (where the same boundary point is less than the previous boundary point fallen below by observed queue depths thereby showing a decreasing trend in queue depth), then processing is performed to scale down or decrease the number of application instances. The particular number of instances scaled down is determined by the particular boundary point that the observed queue depth measurements have fallen below. In at least one embodiment, each of the observed queue depth measurements for the duration of the scan down interval illustrate a decreasing trend (e.g., for the duration of scan down interval successive observed queue depth measurements may be the same or decreasing with time).

In at least one embodiment, the scale down interval may be 5 minutes where queue depth measurements may be taken at a smaller more frequent time interval such as 30 seconds. In such an embodiment, scaling down may be performed if the queue depth violation with respect to a particular boundary point is maintained for each observed queue depth measurement obtained during the 5 minute interval (e.g., it may be required that the observed queue depth value be less than the particular boundary point for each 30 second monitoring period for a total duration time spanning 5 minutes).

Generally, in at least one embodiment, the scale up interval 412 specifies a time duration during which the observed queue depth measurement continuously exceeds a particular boundary point (e.g., the particular boundary point is greater than the last or most recent boundary point exceeded thereby illustrating the increasing trend in observed queue depth values). Generally, in at least one embodiment, the scale down interval 414 specifies a time duration during which the observed queue depth measurement continuously is less than a particular boundary point (e.g., the particular boundary point is less than the last or most recent boundary point that observed queue depths values have fallen below thereby illustrating the decreasing trend in observed queue depth values.).

In following paragraphs, described is a further example illustrating use of techniques for scaling based on queue depth where the current observed queue depth values are obtained at each 30 second interval and the following configuration parameter values are specified: the scale up interval is 30 seconds, the scale down interval is 5 minutes; the scale threshold is 100; the min instance limit is 2; the max instance limit is 10.

Figure 5:
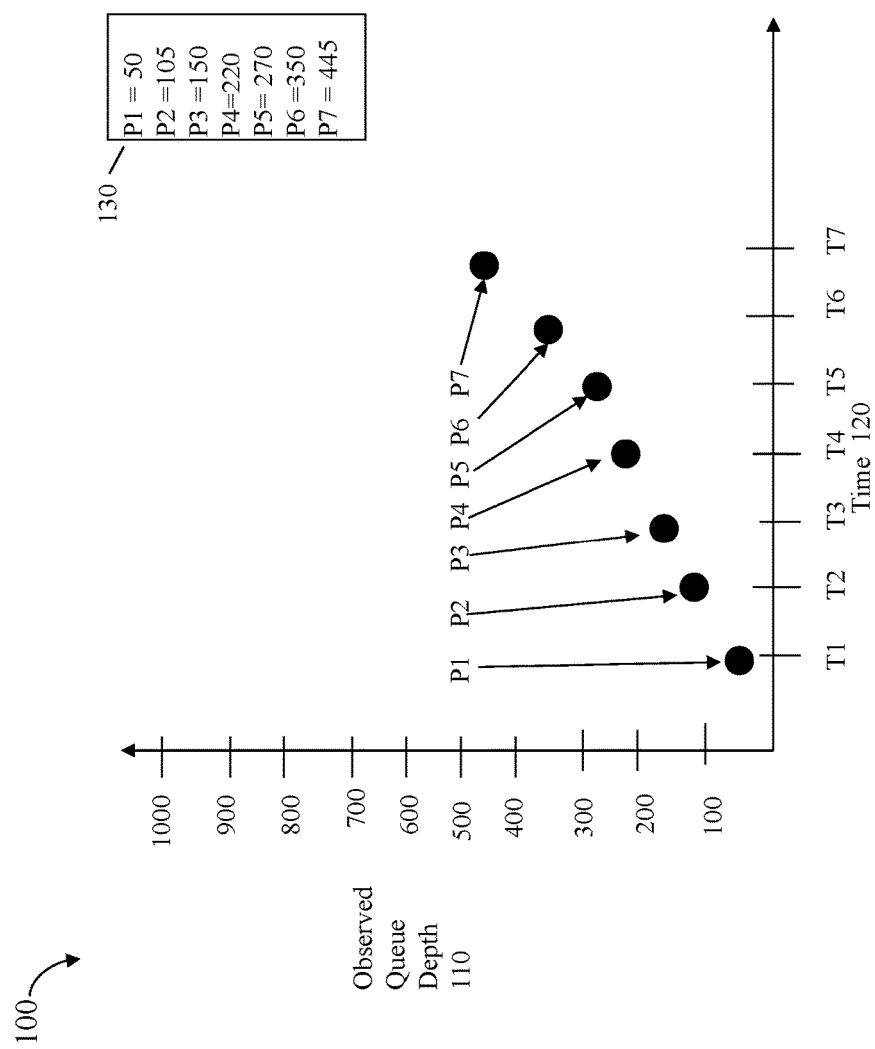
FIGS. 5 and 6 are graphical illustrations of scaling based on queue depth as may be performed in an embodiment in accordance with techniques herein.

Referring to FIG. 5, shown is an example 100 illustrating use of techniques herein with scaling up the number of application instances for a particular application type associated with a queue. The example 100 is a two dimensional graph of observed queue depth values 110 taken at various points in time 120. In this example, T1-T7 denote 7 points in time at which a queue depth measurement may be made. Each of T1-T7 denotes a queue depth measurement taken at a next 30 second time interval. Points P1-P7, respectively, denote the 7 observed queue depth values observed at the points in time T1-T7. Element 130 may denote the queue depth values plotted on the graph of the example 100 for points P1-P7. The Y axis illustrates different boundary points of 100, 200, 300, 400, 500, 600, 700, 800, 900 and 1000, where each such boundary point is a multiple of the scale threshold 100.

At time T1, the current number of application instances is 2 (based on min instance limit parameter) and the queue depth is 50 which does not exceed any boundary point. At time T2, the queue depth is 105 and exceeds boundary point 100. However, consistent with discussion above, there is no scaling up until the same boundary point of 100 is exceeded for a second consecutive time where the amount of time between the two observed queue depths is 30 seconds (as specified by the scale up interval parameter). At time T3, the queue depth is 150 which also exceeds the boundary point 100. At time T3, processing is performed to scale up or increase the number of application instances by 1 whereby the number of application instances is increased to 3.

At time T4, the queue depth further increases to 220 which exceeds the next boundary point of 200. However, consistent with discussion above, there is no scaling up until the same boundary point of 200 is exceeded for a second consecutive time where the amount of time between the two observed queue depths is 30 seconds (as specified by the scale up interval parameter). At time T5, the queue depth is 270 which also exceeds the boundary point 200. At time T5, processing is performed to scale up or increase the number of application instances by 1 whereby the number of application instances is now increased to 4.

At time T6, the queue depth further increases to 350 which exceeds the next boundary point of 300. However, consistent with discussion above, there is no scaling up until the same boundary point of 300 is exceeded for a second consecutive time where the amount of time between the two observed queue depths is 30 seconds (as specified by the scale up interval parameter). At time T7, the queue depth is 445 which also exceeds the boundary point 300. It is noted that 445 also exceeds the boundary point 400 but has not yet exceeded the boundary point of 400 for two consecutive measured or observed queue depth values (with an interval of 30 seconds). Thus, at time T7, processing is performed to scale up or increase the number of application instances by 1 whereby the number of application instances is now increased to 5.

Figure 6:
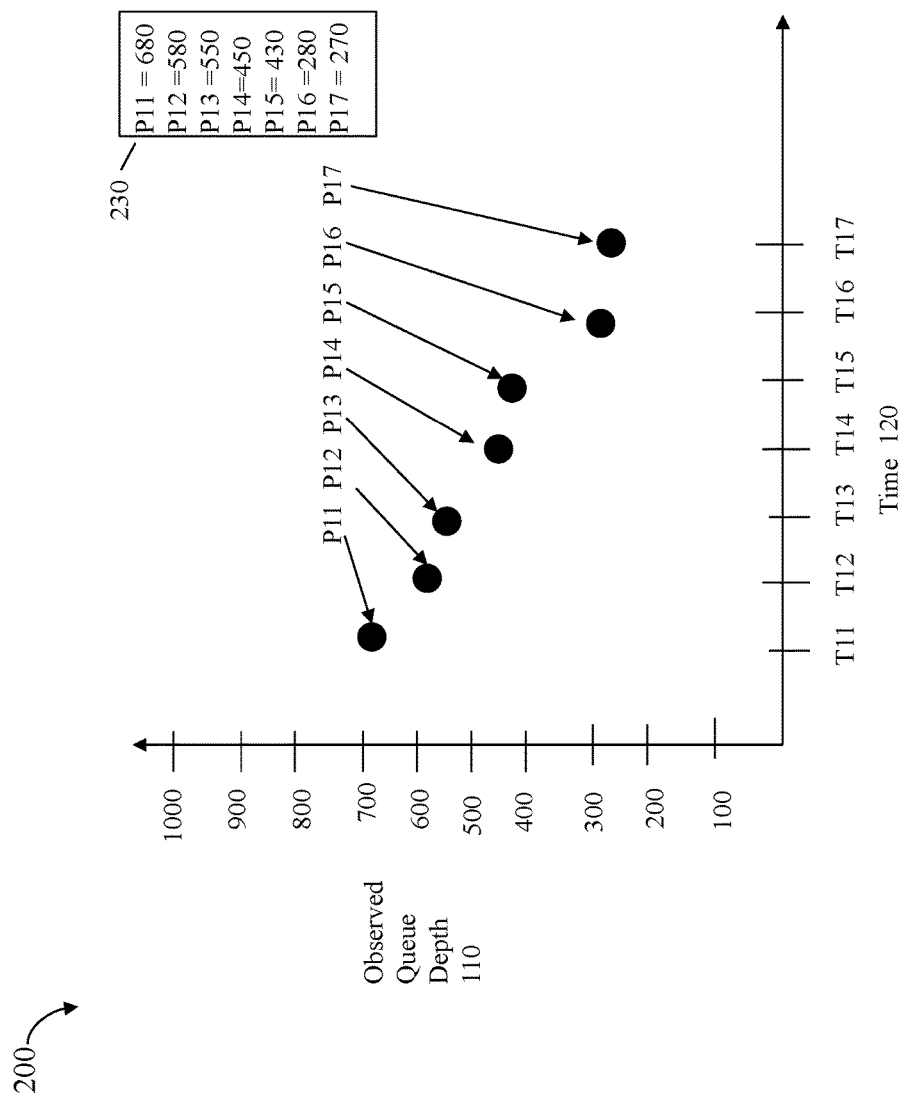

Referring to FIG. 6, shown is an example 200 illustrating use of techniques herein with scaling down the number of application instances of the particular application type associated with the queue. The example 200 is a two dimensional graph of observed queue depth values 110 taken at various points in time 120 as in the example 100. In this example 200, T11-T17 denote 7 points in time at which a queue depth measurement may be made. Each of T11-T17 denotes a queue depth measurement taken at each 5 minute time interval. It should be noted that as discussed elsewhere herein, queue depth measurements may be taken at more frequent time intervals such as every 30 seconds. However, for the purposes of determining whether to scale down and, if so, by how many application instances, the queue depth measurements obtained at each 5 minute interval may be used based on the value of 5 minutes for the scale down interval parameter as discussed above.

For purposes of this example and simplification of illustration, assume that: the specified queue depth measurement P12 at point T12 has been maintained for the 5 minute interval between T11 and T12; the specified queue depth measurement P13 at point T13 has been maintained for the 5 minute interval between T12 and T13; the specified queue depth measurement P14 at point T14 has been maintained for the 5 minute interval between T13 and T14; the specified queue depth measurement P15 at point T15 has been maintained for the 5 minute interval between T14 and T15; the specified queue depth measurement P16 at point T16 has been maintained for the 5 minute interval between T15 and T16; and the specified queue depth measurement P17 at point T17 has been maintained for the 5 minute interval between T16 and T17.

Points P11-P17, respectively, denote the 7 observed queue depth values observed at the points in time T11-T17. Element 230 may denote the queue depth values plotted on the graph of the example 200 for points P11-P17. The Y axis illustrates different boundary points of 100, 200, 300, 400, 500, 600, 700, 800, 900 and 1000, where each such boundary point is a multiple of the scale threshold 100.

At time T11, the current number of application instances is 8 and the queue depth is 680 which is less than the boundary point 700. Based on the configuration scale threshold, the number of instances was increased previously to 8 when the observed queue depth exceeded 700 at a point in time prior to T11. Thus, although the current queue depth of 680 now falls below 700, there is no scaling down until the observed queue depth falls below the same boundary point of 700 for a second consecutive time (where the amount of time between the two observed queue depths is 5 minutes, as specified by the scale down interval parameter). At time T12, the queue depth is 580 which also falls below the boundary point 700. It should be noted that 580 also falls below a lesser boundary point value of 600 also but has not yet fallen below the boundary point of 600 for two consecutive measured or observed queue depth values (with an interval of 5 minutes seconds). Thus, at time T12, processing is performed to scale down or decrease the number of application instances by 1 whereby the number of application instances is now decreased to 7.

At time T13, the queue depth further decreases to 550 which is the second consecutive time (with 5 minute time interval) that the observed queue depth is below 600. Thus, at time T13, the number of application instances is scaled down or decreased by 1 to 6. At time T14, the observed queue depth decreases to 450 which is below the boundary point 500. At time T15, the observed queue depth further decreases to 430 which is also below the boundary point of 500. Thus, at time T15, processing is performed to scale down or decrease the number of application instances by 1 whereby the number of application instances is now decreased to 6.

At time T16, the queue depth is 280 which is less than the two next lower boundary points 400 and 300. However, although the current queue depth of 280 now falls below both 400 and 3000, there is no scaling down until the observed queue depth falls below the same boundary point for a second consecutive time (where the amount of time between the two observed queue depths is 5 minutes, as specified by the scale down interval parameter). At time T17, the queue depth is 270 which also less than both the boundary points 400 and 300. Thus, the current queue depth of 270 is the second consecutive time (with 5 minute span from prior measurement) is less than both boundary points 400 and 300. Based on the scale threshold, at time T17, the number of application instances is scaled down by 2 whereby the number of application instances is now decreased to 4.

Figure 7:
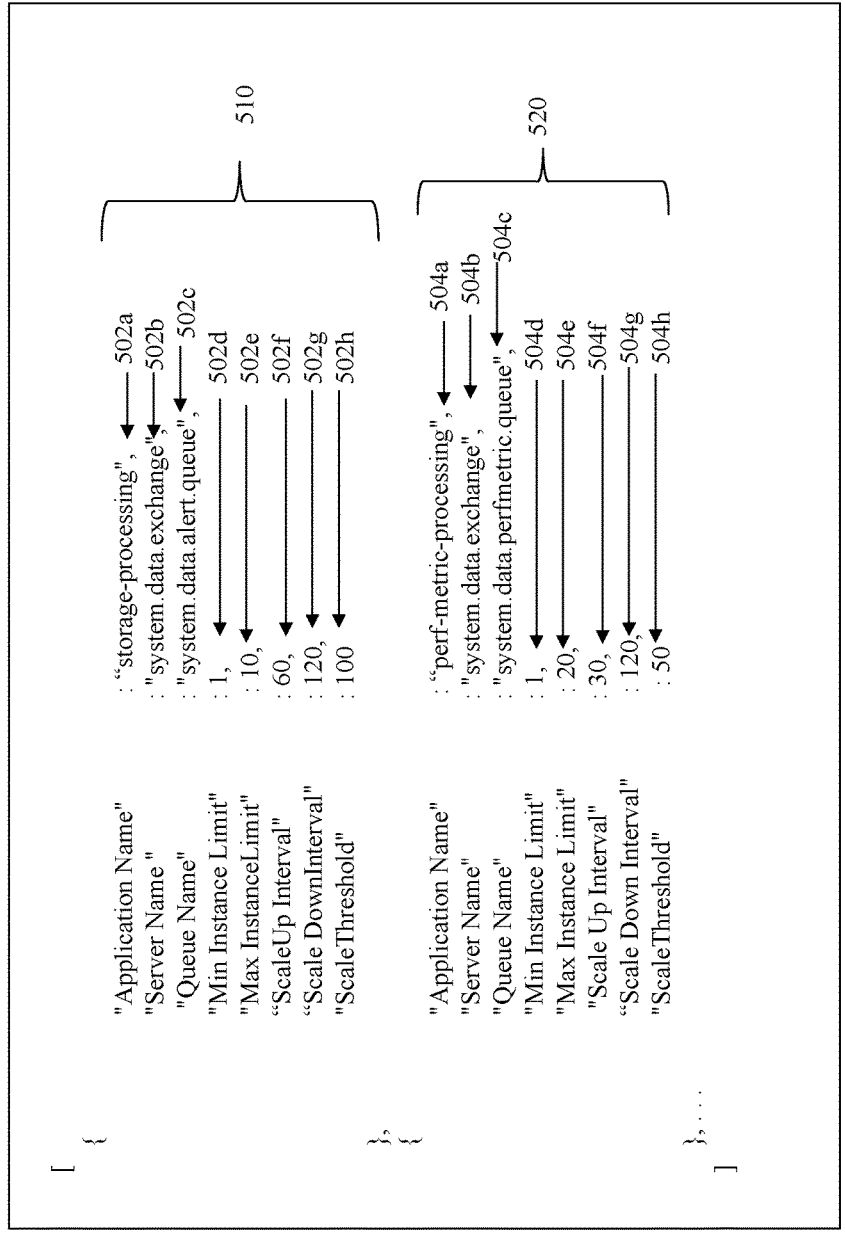
FIG. 7 is an example of a configuration file including configuration parameters that may be used in an embodiment in accordance with techniques herein.

Referring to FIG. 7, shown is an example of a configuration file that may be used in an embodiment in accordance with techniques herein. The example 500 illustrates examples of parameter values that may be specified for 2 different application types. Although the examine 500 has a particular syntax and structure, more generally configuration data for the application types may be expressed using any suitable syntax and structure. Each of 510 and 520 denotes a set of values customized for use with a different application type and each set of values is based on the configuration parameters as described in connection with FIG. 4.

Element 510 denotes the configuration parameter values 502a-h specified for a first application type, storage-processing (502a). Element 520 denotes the configuration parameter values 5024-h specified for a second application type of perf-metric processing (504a) denoting the application type that processed performance metric data from packets.

Generally, for a particular application type and set of configuration parameter values such as 510 or 520, an embodiment may specify a scale up interval that is smaller than the scale down interval. In at least one embodiment, the scale up interval relative to the scale down interval may be 2, 3 or 4 times larger than the scale down interval. For example, 502g is twice the value of 502f, and 504g is four times the value of 504f. The foregoing relative size differences between the scale up and down intervals may be used to avoid thrashing (e.g., avoid modifying the current number of application instances too frequently and/or too soon).

Referring back to FIG. 3, illustrated are components that may be included in a single platform instance such as at a single data center or site. In the example 300, there is a single instance of the app scaler component 302 performing processing in accordance with techniques herein to scale the number of application instances based on queue depth where such application instances, queues, servers, and possibly other components are in the same single platform instance. In such a system, the app scaler component may be characterized as local to, or included in, the single platform instance. As a variation, the app scaler component 302 may be used to interface to and perform scaling for multiple different platform instances such as illustrated in the example 600 of FIG. 8.

Figure 8:
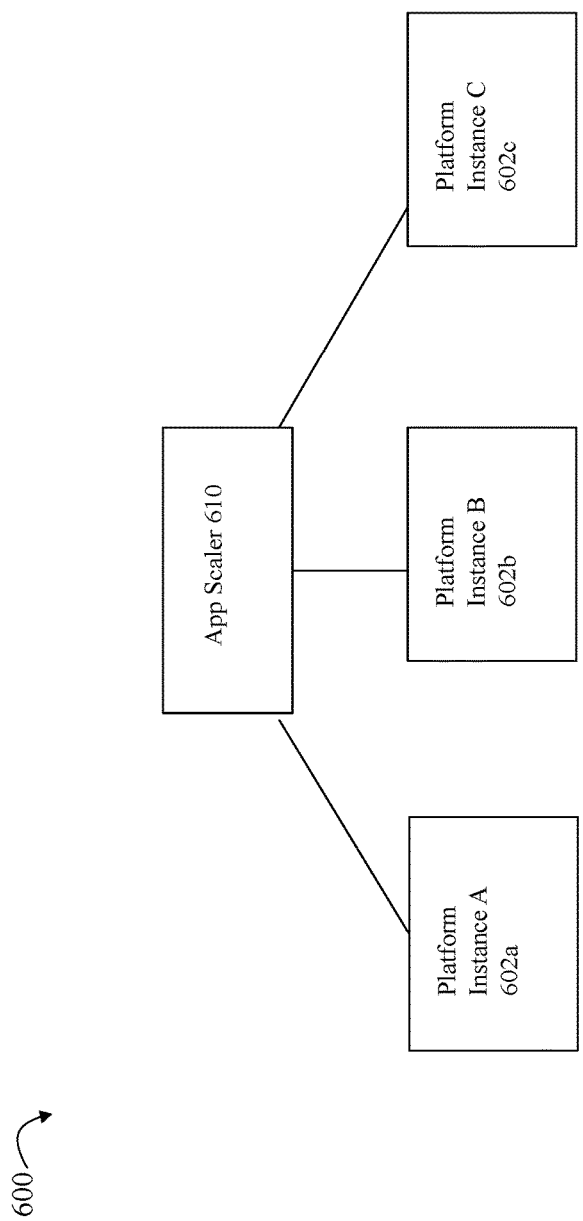

Referring to FIG. 8, element 610 may denote the app scaler component that performs processing similar to that as described in connection with app scaler 302 of FIG. 3. However, in the example 600, the single app scaler instance 610 may perform the monitoring of queue depths and scaling of the number of application instances in accordance with queue depth for multiple platform instances 602a-c. The example 600 illustrates 3 platform instances, however, more generally, the single app scaler instance 610 may perform processing as described herein for any suitable number of platform instances. Each of the platform instances 602a-c may be a separate set of components. For example, each of the platform instances 602a-c may include its own set of servers, queues, application types and instances of each application type, and other entities as may be used with PCF or another suitable platform.

Figure 9:
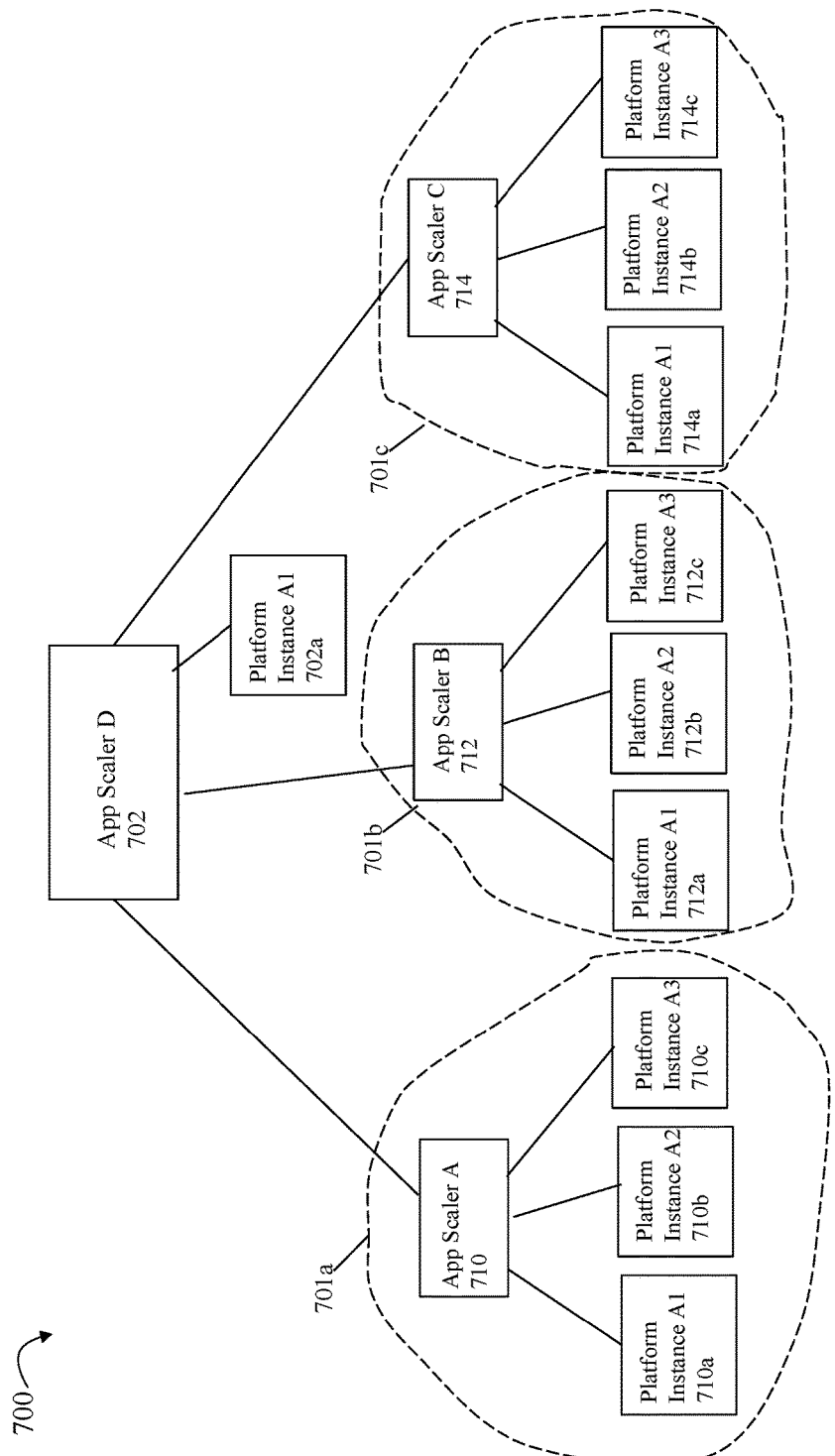

Referring to FIG. 9, shown is another example of a hierarchical arrangement of app scaler and platform instances in an embodiment in accordance with techniques herein. The example 700 generally has a tree-like hierarchy with a root app scaler 702 having child or descendant app scaler instances 710, 712, 714 at a lower level in the hierarchy. The app scaler instances 702, 710, 712 and 714 are similar to the app scaler components 302 of FIG. 3 and 610 of FIG. 8. App scaler 702 may perform scaling based on queue depth as described herein for platform instance 702a (e.g., 702a is similar to 602a as described in FIG. 8). Additionally, each of 701a-c denotes a set of components which are similar to, or another instance of, the set of components from FIG. 8 (e.g. elements 710, 710a-c are respectively similar to 610, 602a-c of FIG. 8; elements 712, 712a-c are respectively similar to 610, 602a-c of FIG. 8; and elements 714, 714a-c are respectively similar to 610, 602a-c of FIG. 8). In this hierarchy, each of the app scalers 710, 712 and 714 report to and communicate with app scaler instance 702.

App scaler 702 may be characterized as the root or main app scaler instance to which other app scaler instances 710, 712 and 714 at a lower level in the hierarchy) report and communicate. In such an arrangement as in FIG. 9, app scaler 702 may control scaling based on queue depth for platform instance 702; and app scalers 710, 712, 714 may respectively control scaling based on queue depth for platform instances 710a-c, 712a-c, 714a-c. However each of the app scaler instances 710, 712, 714 at the lower level may further report its storage analytics and other information to app scaler 702. In this manner, app scaler 702 may further provide a more global or broader view of storage analytics as described herein across all platforms 702a, 710a-c, 712a-c and 714a-c. Additionally, each of the app scaler instances 710, 712 and 714 may provide a narrower view of storage analytics as described herein. For example, a user logging into the management application instance including app scaler 710 may be provided with information regarding only platforms 710a-c. However, a user logging into the management application instance including app scaler 702 may be provided with the above-noted broader view collectively for platforms 702a, 710a-c, 712a-c and 714a-c.

Figure 10:
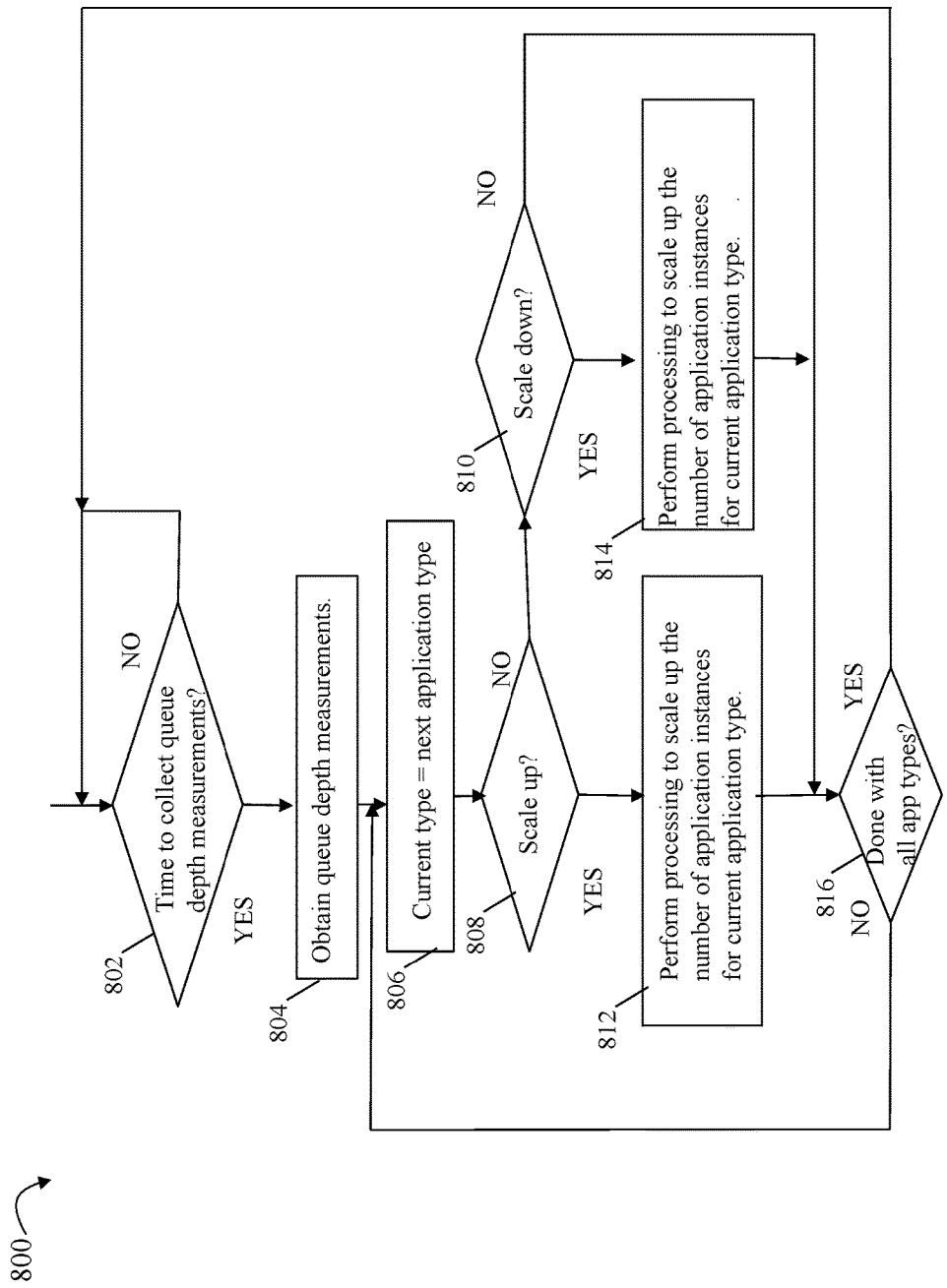
FIGS. 10 and 11 are flowcharts of processing steps that may be performed in an embodiment in accordance with techniques herein.

Referring to FIG. 10, shown is a flowchart 800 of processing steps that may be performed in an embodiment in accordance with techniques herein. The steps of 800 summarize processing as described above that may be performed by the app scaler component in an embodiment in accordance with techniques herein. At step 802, a determination is made as to whether it is time to collect the next set of queue depth measurements for the application queues. If step 802 evaluates to no, control remains at step 802. If step 802 evaluates to yes, control proceeds to step 804 where the queue depth measurements are obtained for the different queues subscribed to by the respective different application types. At step 806, current application type is assigned the next application type for which processing is performed to determine whether to scale up or down the number of application instances of the current application type.

At step 808, a determination is made as to whether to scale up the number of application instances of the current application type. As described herein, step 808 determination may be made in accordance with the observed queue depth measurements obtained for the queue used by the current application type, the configured threshold and boundary point multiples of the configured threshold, and the scale up interval. If step 808 evaluates to yes, control proceeds to step 812 to perform processing to scale up the number of application instances for the current application type. Step 812 processing may include determining whether to scale up the number of application instances by 1 or more, whereby the revised number of application instances of the current application type will not exceed the max instance limit. From step 812, control proceeds to step 816.

If step 808 evaluates to no, control proceeds to step 810. At step 810, a determination is made as to whether to scale down the number of application instances of the current application type. As described herein, step 810 determination may be made in accordance with the observed queue depth measurements obtained for the queue used by the current application type, the configured threshold and boundary point multiples of the configured threshold, and the scale down interval. If step 810 evaluates to yes, control proceeds to step 814 to perform processing to scale down the number of application instances for the current application type. Step 814 processing may include determining whether to scale down the number of application instances by 1 or more, whereby the revised number of application instances of the current application type will not fall below the min instance limit. From step 814, control proceeds to step 816. If step 810 evaluates to no, control proceeds to step 816. At step 816, a determination is made as to whether processing has been performed for all application types and thus with respect all queues used by the different application types. If step 816 evaluates to no, control proceeds to step 806 to perform processing to determine whether to scale up or down the number of application instances of the next application type. If step 816 evaluates to yes, control proceeds to step 802.

Figure 11:
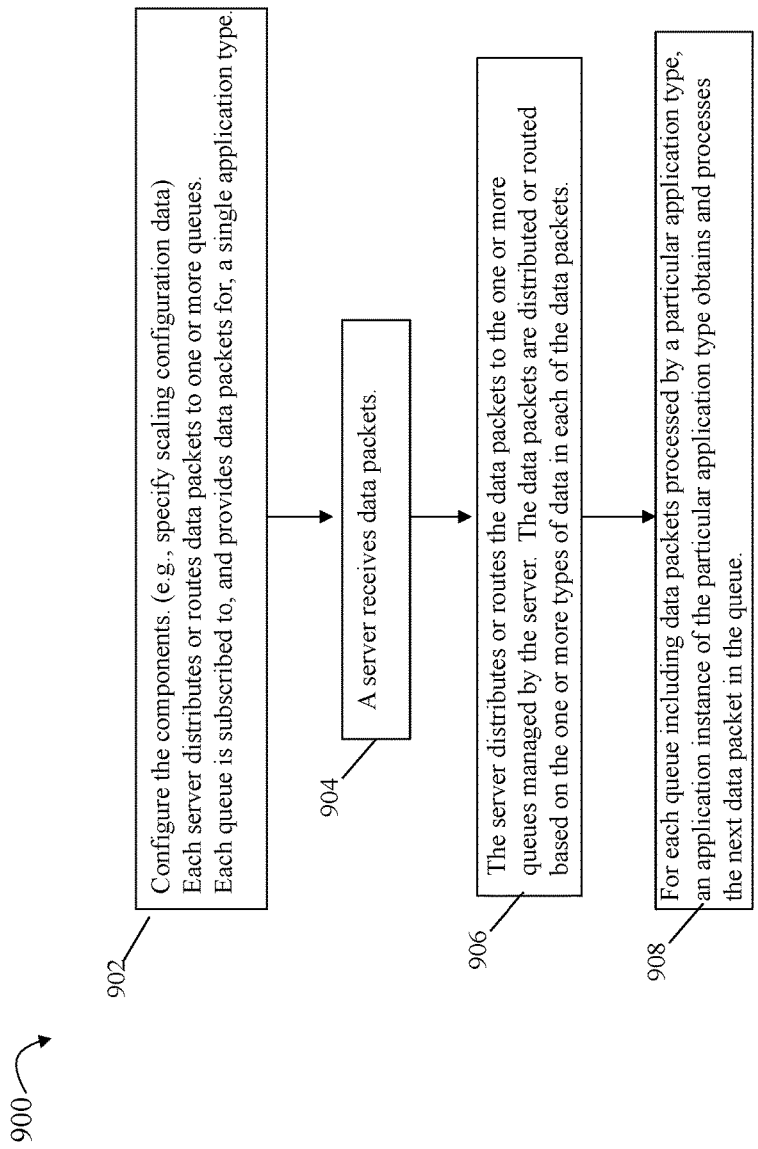

Referring to FIG. 11, shown is another flowchart of processing steps that may be performed in an embodiment in accordance with techniques herein. The flowchart 900 summarizes processing that may be performed in connection with configuring the system and the packet data flow and processing between such components. At step 902, the components of the system, such as illustrated in FIG. 3, may be configured. For example, the scaling configuration data for each application may be specified identifying the relationships between various entities such as servers, queues, and application types. In the configuration described herein in at least one embodiment, each server distributes or routes data packets to one or more queues. Additionally, each queue is subscribed to, and provides data packets for, a single application type. At step 904, a server receives data packets. At step 906, the server distributes or routes the data packets to the one or more queues managed by the server. The data packets are distributed or routed based on the one or more types of data in each of the data packets. At step 908, for each queue including data packets processed by a particular application type, an application instance of the particular application type obtains and processes the next data packet in the queue.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing application scaling comprising:

receiving, using a processor, a plurality of observed queue depth values for a queue, wherein the queue includes data packets to be processed by a first set of one or more applications of a first application type;

determining, using a processor and in accordance with the plurality of observed queue depth values and scaling configuration parameters for the first application type, whether to modify a number of applications currently in the first set, wherein the scaling configuration parameters includes a scaling threshold; and responsive to determining to modify the number of applications currently in the first set, performing, using a processor, first processing that modifies the number of applications currently in the first set.

2. The method of claim 1, wherein the first processing includes:
   determining, in accordance with the plurality of observed queue depth values and the scaling configuration parameters for the first application type, whether to increase the number of applications currently in the first set; and
   responsive to determining to increase the number of applications currently in the first set, performing second processing that increases the number of applications currently in the first set.

3. The method of claim 2, wherein the scaling configuration parameters are specified for the first set of one or more applications of the first application type and wherein the scaling configuration parameters further include a scale up interval identifying a time duration for which a measured queue depth of the queue is required to exceed a boundary point in order to increase the number of applications currently in the first set, wherein the boundary point is a multiple of the scaling threshold.

4. The method of claim 3, wherein the number of applications is increased by an amount determined in accordance with the scaling threshold and the boundary point.

5. The method of claim 4, wherein the boundary point is one of a plurality of boundary points determined in accordance with the scaling threshold and wherein the number of applications is increased by one (1) for each multiple of the scaling threshold.

6. The method of claim 5, wherein the scaling configuration parameters include a minimum limit, denoting a minimum number of application instances configurable for the first set, and wherein the scaling configuration parameters include a maximum limit denoting a maximum number of application instances configurable for the first set.

7. The method of claim 6, wherein the second processing includes:
   adding, in accordance with the maximum limit, one or more additional applications of the first application type to the first set.

8. The method of claim 1, wherein the first processing includes:
   determining, in accordance with the plurality of observed queue depth values and the scaling configuration parameters for the first application type, whether to decrease the number of applications currently in the first set; and
   responsive to determining to decrease the number of applications currently in the first set, performing second processing that decreases the number of applications currently in the first set.

9. The method of claim 8, wherein the scaling configuration parameters specified for the first set of one or more applications of the first application type includes a scale down interval identifying a time duration for which a measured queue depth of the queue is required to be less than a boundary point in order to decrease the number of applications currently in the first set, wherein the boundary point is a multiple of the scaling threshold.

10. The method of claim 9, wherein the number of applications is decreased by an amount determined in accordance with the scaling threshold and the boundary point.

11. The method of claim 10, wherein the boundary point is one of a plurality of boundary points determined in accordance with the scaling threshold and wherein the number of applications is decreased by one (1) for each multiple of the scaling threshold.

12. The method of claim 11, wherein the scaling configuration parameters include a minimum limit, denoting a minimum number of application instances configurable for the first set, and wherein the scaling configuration parameters include a maximum limit denoting a maximum number of application instances configurable for the first set.

13. The method of claim 12, wherein the second processing includes:
   removing, in accordance with the minimum limit, one or more applications of the first application type from the first set.

14. The method of claim 1, wherein the plurality of observed queue depth values for the queue are obtained at occurrences of a defined time period.

15. The method of claim 1, wherein the queue is one of a plurality of queues, the first application type is one of a plurality of application types, each of the plurality of application types has a corresponding set of one or more applications of said each of the plurality of application types.

16. The method of claim 15, wherein each of the plurality of queues includes data packets to be processed by a different one of the plurality of application types, and each application of a particular one of the plurality of application types subscribes to one of the plurality of queues based on a match between types of data processed by said each application and types of the data packets in said one of the plurality of queues.

17. The method of claim 16, further comprising:
   receiving a plurality of data packets each including one or more types of the data packets in the plurality of queues; and
   distributing the plurality of data packets to the plurality of queues in accordance with the one or more types of the data packets in the plurality of packets.

18. A non-transitory computer readable medium comprising code stored thereon that, when executed, performs a method of performing application scaling comprising:
   receiving a plurality of observed queue depth values for a queue, wherein the queue includes data packets to be processed by a first set of one or more applications of a first application type;
   determining, in accordance with the plurality of observed queue depth values and scaling configuration parameters for the first application type, whether to modify a number of applications currently in the first set, wherein the scaling configuration parameters includes a scaling threshold; and
   responsive to determining to modify the number of applications currently in the first set, performing first processing that modifies the number of applications currently in the first set.

19. A system comprising:
   one or more processors; and
   a memory comprising code stored thereon that, when executed by at least one of the one or more processors performs a method of application scaling comprising:
      receiving a plurality of observed queue depth values for a queue, wherein the queue includes data packets to be processed by a first set of one or more applications of a first application type;
      determining, in accordance with the plurality of observed queue depth values and scaling configuration parameters for the first application type, whether to modify a number of applications currently in the first set, wherein the scaling configuration parameters includes a scaling threshold; and responsive to determining to modify the number of applications currently in the first set, performing first processing that modifies the number of applications currently in the first set.

\* \* \* \* \*